Oct. 23, 1945.   C. CHRISTEL   2,387,564
WINDSHIELD AND CLEANER THEREFOR
Filed Jan. 30, 1943

INVENTOR
CONRAD CHRISTEL
BY
Bean, Brooks, Buckley & Bean
ATTORNEYS

Patented Oct. 23, 1945

2,387,564

UNITED STATES PATENT OFFICE 2,387,564

WINDSHIELD AND CLEANER THEREFOR

Conrad Christel, Buffalo, N. Y., assignor to Trico Products Corporation, Buffalo, N. Y.

Application January 30, 1943, Serial No. 474,099

5 Claims. (Cl. 15—255)

This invention relates to vehicular transparencies and means for wiping the same.

In the evolution of streamlined vehicular bodies, windshields have presented a particular problem in contouring, since windshield wipers preferably have straight wiping blades and such blades cannot operate upon convex or other compound curved surfaces. The present invention contemplates the provision of a specially formed windshield surface and a windshield wiper rock shaft is arranged in a particular relation with respect to the special surface so provided, the windshield wiper being of the widely used oscillating type.

According to the present invention a part at least of the windshield or other transparency comprises a portion of the surface of a cone, such part constituting the area to be wiped, and such portion will hereinafter be referred to as a conic surface. The combination of the present invention is completed by disposing a windshield wiper for oscillation about an axis coincident with the axis of generation of the cone of which the conic surface portion of the windshield forms a part.

The cone, a portion of whose surface is adopted for a portion or all of the windshield surface, is, generally speaking, of relatively large base diameter as compared with its altitude, and is accordingly aptly designated an obtuse-angled cone. Various portions of the surface of such a cone may be used as all or part of a vehicular transparency; in any case, the important thing being to dispose the windshield wiper rock shaft along the axis of generation of the cone. By virtue of this construction a straight blade having a rectilinear wiping edge may be employed and the blade will at all times have a full, straight line of contact with the windshield surface. Further, the angle between the rock shaft and the wiper arm will be constant, so that wiping pressure will be uniform throughout the wiping strokes.

In proceeding in accordance with the teachings of the present invention it will be found that a windshield surface is afforded which has the appearance of a convex or compound curved surface. In fact, any cross-section through the conic surface portion of such windshield, regardless of direction, will be a curved one, excepting only sections taken along elements of the cone which forms the pattern for the surface, that is, sections extending directly through the axis of the cone.

In the specific example illustrated in the drawing the entire windshield pane is taken from the surface of a cone, but it is to be understood that only the area which is traversed by an oscillating wiper blade during normal wiping action need be so formed. Portions of the windshield transparency lying outside of the area actually wiped may be modified or curved or shaped in any desired manner, generally in a way calculated to promote aero-dynamic efficiency and eye-appeal. An advantage of the conic surface method of forming transparencies is found in the fact that a compound curved surface is thus afforded which may be formed by simple bending of a flat worksheet, without the necessity for drawing or molding. Objectional aberrational effects attendant upon drawing or molding transparent sheets are avoided and good optical properties result. The avoidance of the necessity for drawing or molding is believed to be particularly advantageous in the formation of laminated shatter-proof transparencies.

Figure 1:
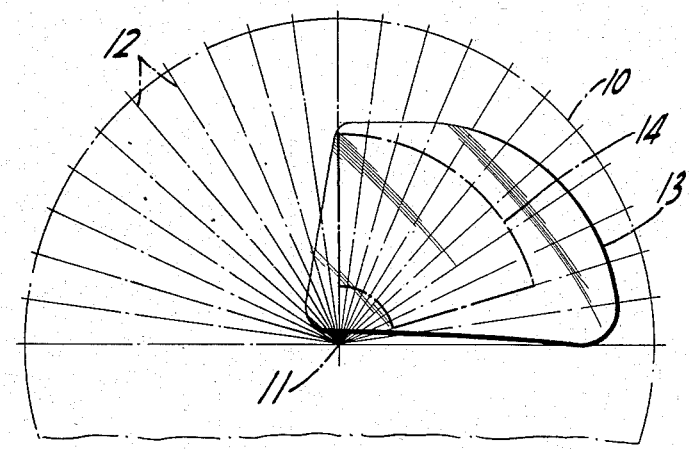
Fig. 1 is a fragmentary schematic view looking along the axis of a cone and indicating a portion thereof which is to be employed as a windshield pane.

Throughout the several figures of the drawing, like characters of reference denote like parts and the numeral 10 designates the base circle of a cone whose surface serves as the surface pattern of a windshield pane. The numeral 11 designates the axis of such cone and the numeral 12 designates a number of elements of the surface of the cone in Figs. 1 through 3.

Figure 2:
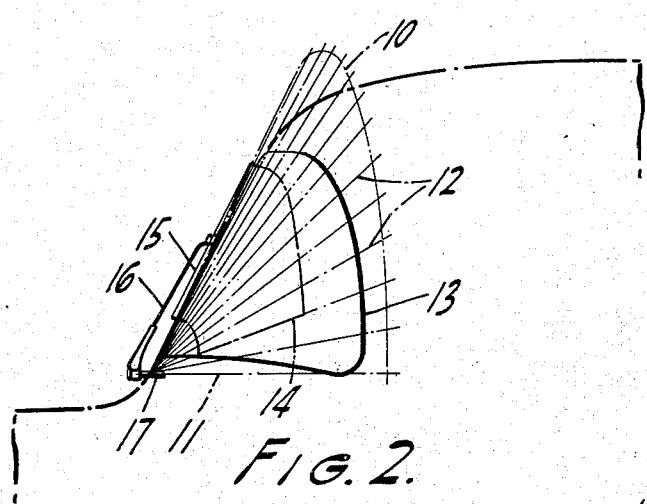
Fig. 2 is a fragmentary schematic side elevational view of a vehicle fitted with the transparency indicated in Fig. 1; and, Fig. 3 is a diagrammatic plan view of a pair of cooperating windshield panes.

In Fig. 1 the numeral 13 shows the outline of an exemplary windshield formed to match the surface pattern of the cone and the dot and dash line showing designated 14 in Fig. 1 indicates an area to be traversed by a conventional oscillating windshield wiper. It will be noted that the arcuate wiped area is concentric with the axis of the cone. The windshield wiper is shown in Fig. 2 as having a conventional straight blade 15, a conventional spring-tensioned arm 16, and an oscillatable rock shaft 17.

Figure 3:
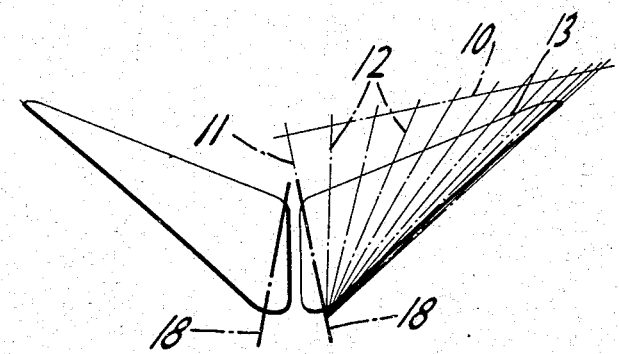

In Fig. 3 a pair of rock shaft axes are indicated by the heavy dot and dash lines 18 and such axes are coincident with the axes 11 of the cones which serve as the patterns for the respective pane sections.

Conventional divided windshields have their panes disposed obliquely and a common motor usually serves to oscillate a pair of obliquely extending rock shafts. It is accordingly obvious that conventional windshield cleaner motors and conventional transmission means may be employed.

While a single specific embodiment is illustrated by way of example, it is to be understood that any part of the surface of a cone may be employed without departing from the principles of the present invention. By merely choosing another section of the surface of the cone the relative position of the axis of the cone may be disposed anywhere with respect to the windshield. It will generally be desirable to have the axis of the cone fall somewhere just outside of the pane. While the axis of the cone and the rock shaft of the present example is disposed very close to the longitudinal center of the vehicle and at the under side of the pane, such axis may be disposed at the outer lower corner of the pane, above the pane, or in any desired position. Further, while a divided windshield is illustrated, it is obvious that the entire windshield transparency may be a single pane having a wiped area patterned after the surface of a single continuous section of a cone. In Fig. 1, for instance, the transparency 13 might be extended to the left to such degree as to make its contour symmetrical about a vertical center line and such transparency could comprise an entire windshield.

What is claimed is:

1. In combination, a vehicular transparency having a portion of the surface thereof comprising a conic surface, and a windshield cleaner having an oscillatable rock shaft and a wiping blade secured for oscillation therewith, said blade having a rectilinear wiping edge for traversing said conic surface portion, the axis of said rock shaft and the axis of generation of said conic surface portion being coincident.

2. In combination, a vehicular transparency having a portion of the surface thereof comprising a conic surface, said conic surface having an axis of generation spaced from said surface, and a windshield cleaner having an oscillatable rock shaft and a wiping blade secured for oscillation therewith, said blade having a rectilinear wiping edge for traversing said conic surface portion, the axis of said rock shaft and the axis of generation of said conic surface being coincident.

3. In combination, a vehicular transparency comprising a conic surface, and a windshield cleaner having an oscillatable rock shaft and a wiping blade secured for oscillation therewith, said blade having a rectilinear wiping edge for traversing said conic surface portion, the axis of said rock shaft and the axis of generation of said conic surface being coincident.

4. A curved vehicular transparency for association with an oscillating windshield wiper having a straight wiping edge, said transparency comprising a portion of the surface of an obtuse-angled cone, the axis of generation of said conic surface portion being disposed adjacent the margin of said transparency and coincident with the axis of oscillation of the windshield wiper.

5. A curved vehicular transparency for association with an oscillating windshield wiper having a straight wiping edge, said transparency comprising a portion of the surface of an obtuse-angled cone, the axis of generation of said conic surface portion being coincident with the axis of oscillation of the windshield wiper.

CONRAD CHRISTEL.